United States Patent
Kissel, Jr.

(10) Patent No.: US 9,004,327 B2
(45) Date of Patent: Apr. 14, 2015

(54) INSERTION GUIDE FOR ANIMAL FOOTWEAR

(71) Applicant: WFK & Associates, LLC, Gainesville, FL (US)

(72) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 0 days.

(21) Appl. No.: 14/016,776

(22) Filed: Sep. 3, 2013

(65) Prior Publication Data

US 2014/0061260 A1    Mar. 6, 2014

Related U.S. Application Data

(60) Provisional application No. 61/695,553, filed on Aug. 31, 2012.

(51) Int. Cl.
| | | |
|---|---|---|
| *A47G 25/82* | (2006.01) | |
| *A01K 13/00* | (2006.01) | |
| *A47G 25/90* | (2006.01) | |
| *A47G 25/80* | (2006.01) | |

(52) U.S. Cl.
CPC .............. *A47G 25/80* (2013.01); *A01K 13/007* (2013.01); *A47G 25/905* (2013.01)

(58) Field of Classification Search
CPC ....... A47G 25/80; A47G 25/82; A47G 25/90; D06C 5/005; A43B 11/00; A43B 11/02
USPC .......................... 223/111, 112, 113, 118, 119
See application file for complete search history.

(56) References Cited

U.S. PATENT DOCUMENTS

| | | | | |
|---|---|---|---|---|
| 19,284 | A | * | 2/1858 | Allender ....................... 223/119 |
| 312,321 | A | * | 2/1885 | Blohm ......................... 223/113 |
| 339,258 | A | * | 4/1886 | Blenkhorn ................... 223/119 |
| 438,105 | A | | 10/1890 | Geyer |
| 1,224,846 | A | * | 5/1917 | Brooks ......................... 223/119 |
| 1,992,344 | A | * | 2/1935 | Alhadate ........................ 602/63 |
| 2,443,831 | A | | 6/1948 | Miller |
| 2,840,082 | A | * | 6/1958 | Salvatore ..................... 606/140 |
| 3,742,679 | A | | 7/1973 | Jordan |

(Continued)

FOREIGN PATENT DOCUMENTS

| | | |
|---|---|---|
| DE | 202005002783 | 1/2006 |
| DE | 102005044595 A1 | 3/2007 |

OTHER PUBLICATIONS

PetsMart, Product Page for "Pet Life 'Double-Ring' Pet Harness with Built-in Velcro Back Pouch" [online], PetsMart [retrieved on Apr. 12, 2012], [retrieved from the Internet]: URL: http://www.petsmart.com/product/index.jsp?productId=12293236&SR=sr3_8755183_go&lmdn=Dog+Collars%2C+Tags+%26amp%3B+Leashes&gclid=CLeFzueNra8CFUPf4Aodsiaapg.

*Primary Examiner* — Ismael Izaguirre
(74) *Attorney, Agent, or Firm* — GrayRobinson P.A.; Michael J. Colitz, III

(57) ABSTRACT

Disclosed is a paw insertion device. In one embodiment, the device includes two pivotally interconnected arms. Each of the arm can include a paw insertion guide at a distal end. The insertion guides are designed to be inserted into an article of animal footwear. The opposite grip ends of the arms can then be brought together to spread apart the insertion guide and permit the animal paw to be easily positioned within the footwear. A lock subassembly is also included for permitting the insertion device to be locked in the opened position.

6 Claims, 7 Drawing Sheets

(56) References Cited

U.S. PATENT DOCUMENTS

| | | | |
|---|---|---|---|
| 4,249,720 A * | 2/1981 | Weyand et al. | 266/104 |
| 4,744,333 A | 5/1988 | Taylor | |
| 5,184,762 A | 2/1993 | Nevitt | |
| D376,448 S | 12/1996 | Caditz | |
| 5,676,095 A | 10/1997 | Ralls | |
| 6,234,369 B1 * | 5/2001 | Bort | 223/112 |
| 6,481,383 B1 | 11/2002 | Ross et al. | |
| 6,564,753 B1 | 5/2003 | Heileg et al. | |
| 6,851,394 B1 | 2/2005 | Young | |
| 2011/0017151 A1 | 1/2011 | Simoni | |

\* cited by examiner

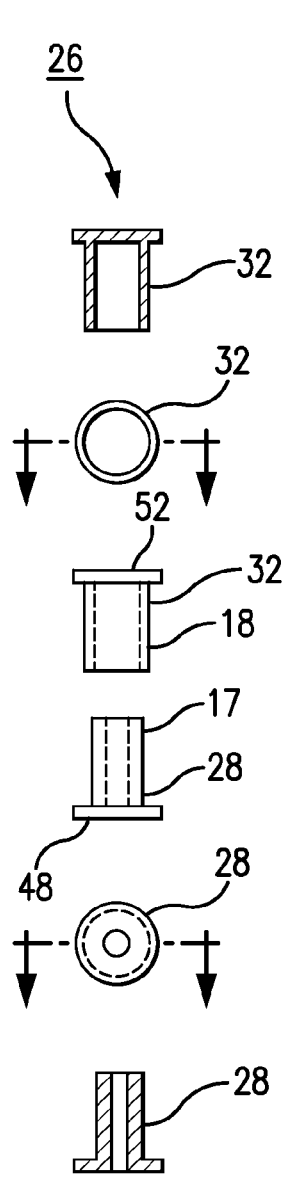
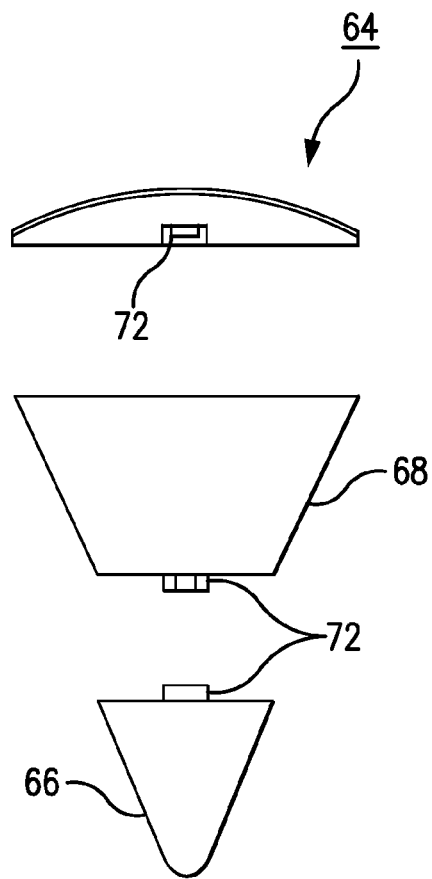
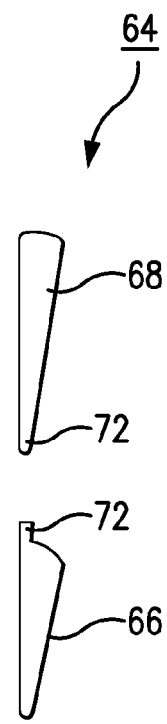
FIG. 4
FIG. 5A
FIG. 5B

INSERTION GUIDE FOR ANIMAL FOOTWEAR

RELATED APPLICATION DATA

This application claims priority to application Ser. No. 61/695,553 filed on Aug. 31, 2012 and entitled "Canine Footwear Paw Insertion Guide." The contents of this application are fully incorporated herein for all purposes.

BACKGROUND OF THE INVENTION

Canine footwear has become increasingly popular. The footwear provides many paw protective benefits to animals, such as canines. There is, however, a problem when it comes to using canine footwear. The problem is that it can be difficult, awkward and time consuming when putting any kind of footwear onto a canine paw.

In the state of the art the current inventor hereof has proposed a horseshoe shaped insert that will hold the footwear in an open and somewhat secure position while a paw is inserted. The disadvantage of this is that each horseshoe shaped footwear guide is size specific, it requires some effort to get the footwear stretched over the horseshoe and some footwear may be difficult to stretch far enough over the horseshoe shaped guide.

SUMMARY OF THE INVENTION

It is an objective of this invention to provide an insertion guide that can easily be positioned into each piece or set of footwear in a closed position.

It is an objective of this invention to provide an insertion guide that can be used with all sizes and configurations of footwear.

It is an objective of this invention to provide an insertion guide that guides the paw to the opening of the footwear.

It is an objective of this invention to provide an insertion guide that holds the opening into the footwear wide open to make inserting a paw easy.

It is an objective of this invention to provide an insertion guide that can lock into a set position while the footwear is placed over the paw and can then be released.

It is an objective of this invention to provide an insertion guide that has interchangeable paw guide funnels and footwear insertable stretchers.

It is an objective of this invention to provide an insertion guide that provides a leveraged side arm, such that when it is squeezed together on the hand held end the other end will open the footwear.

The subject invention is called Insertion Guide for Animal Footwear. The purpose of this invention is to make inserting an animal paw into a piece of animal footwear an easy and rapid process.

The basic tool consists of two handle grips joined at the center. One end of the handle grips is for holding the tool. The other ends of the handles come together and have a set of paw guides attached near the end. A set of paw guides are two identical guides with three sections. There is a mounting bracket section. There is a funnel section at the top for guiding the paw to the footwear opening. There is a footwear insertable stretcher section at the bottom that inserts into the top of the footwear while the tool is closed, and then stretches the opening of the footwear when the gripping handle is squeezed. A ridged disc at the hinge of the handles locks into corresponding matching ridges on the handles and holds the guide open while the paw is inserted. Pressing the other side of the grooved disc releases the locking action so the paw guide can be removed after the footwear is in place.

Various embodiments of the disclosure may have none, some, or all of these advantages. Other technical advantages of the present disclosure will be readily apparent to one skilled in the art.

BRIEF DESCRIPTION OF THE SEVERAL VIEWS OF THE DRAWINGS

FIG. 3a is a plan view of one side of the insertion guide.

FIG. 3b is a side elevational view taken along line 3b-3b of FIG. 3a.

FIG. 4 is an exploded view of the locking subassembly with interlocking male and female fasteners.

FIG. 5a is an exploded view of the paw guide subassembly.

FIG. 5b is a side elevational view taken along line 5b-5b of FIG. 5a.

Similar reference characters refer to similar parts throughout the several views of the drawings.

---

PARTS LIST

20 Paw Insertion Guide
22 Side Arms of Insertion Guide
24 Hinge Plate of Side Arms
26 Lock Subassembly for Side Arms
28 Male Fastener of Lock Subassembly
30 Arcuate Protrusion
32 Female Fastener of Lock Subassembly
34 Grip Ends of Side Arms
36 Stretcher Ends of Side Arms
38 Torsion Spring
42 Lock of Side Arms
44 Geared Surface of Lock
46 Shaft of Lock
48 Opening in Male Fastener
52 Opening in Female Fastener
54 Spring
56 Spindle on Hinge Plate
58 Hinge Plate Release
60 Apertures within Side Arms
62 Geared Surface of Side Arms
64 Paw Guides
66 Insertion Portion of Guide
68 Funnel Portion of Guide
72 Connector
74 Slot for Paw Guide Portion

---

DETAILED DESCRIPTION OF THE INVENTION

The present disclosure relates to a paw insertion device. In one embodiment, the device includes two pivotally interconnected arms. Each arm can include a paw insertion guide at a distal end. The insertion guides are designed to be inserted into an article of animal footwear. The opposite grip ends of the arms can then be brought together to spread apart the insertion guide and permit the animal paw to be easily positioned within the footwear. A lock subassembly is also included for permitting the insertion device to be locked in the opened position. The various details of the present invention, and the manner in which they interrelate, are described in greater detail hereinafter.

Figure 1:
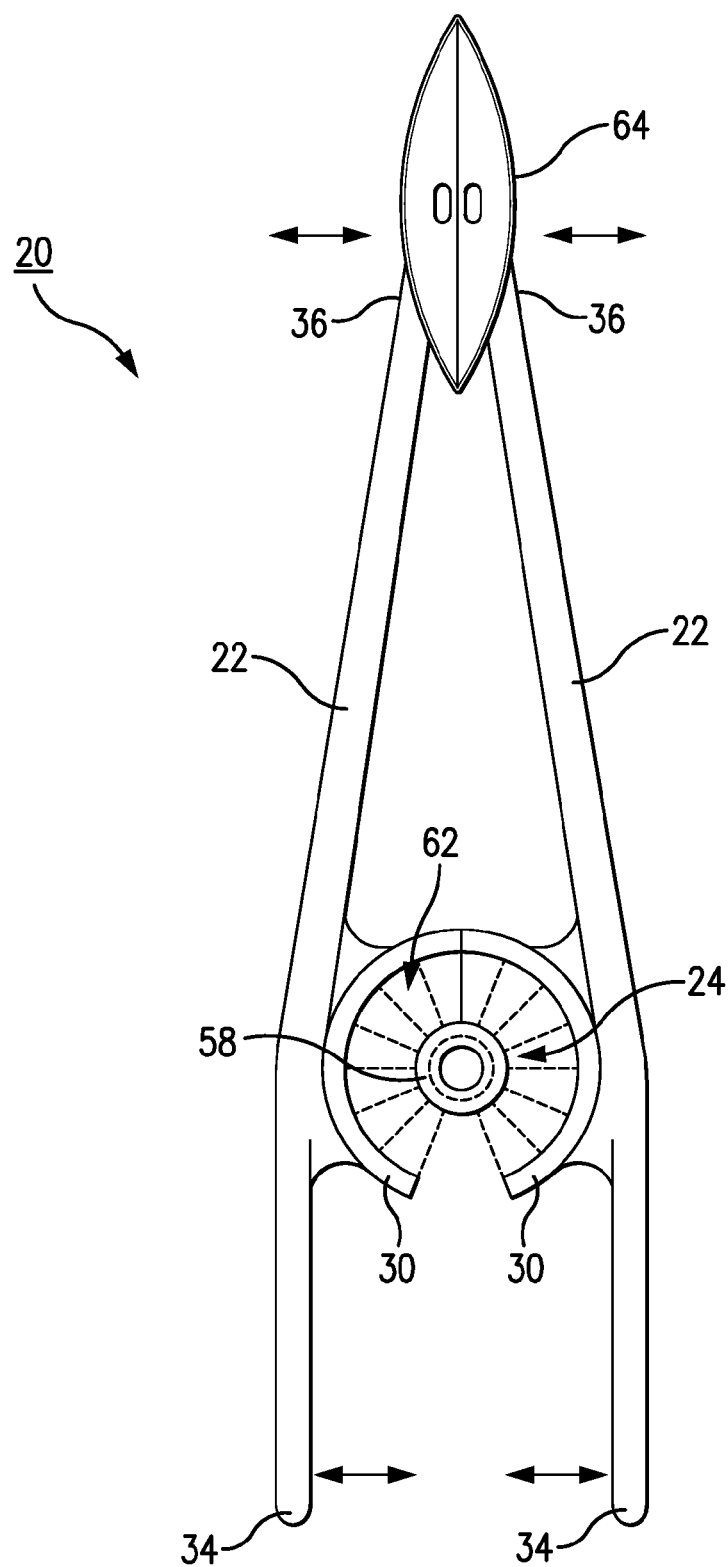
FIG. 1 is a plan view of the insertion guide of the present disclosure.
Figure 2:
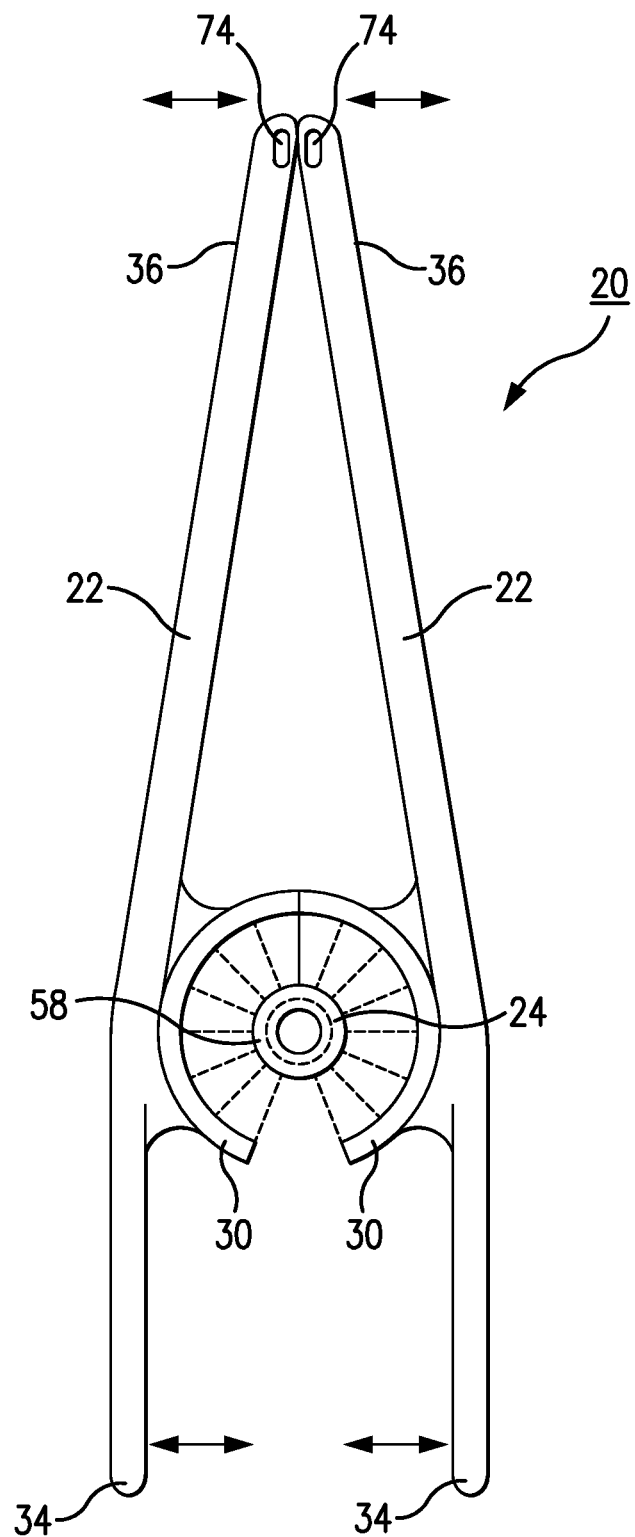
FIG. 2 is a plan view of the insertion guide with the paw guides removed.
Figures 3A, 3B:
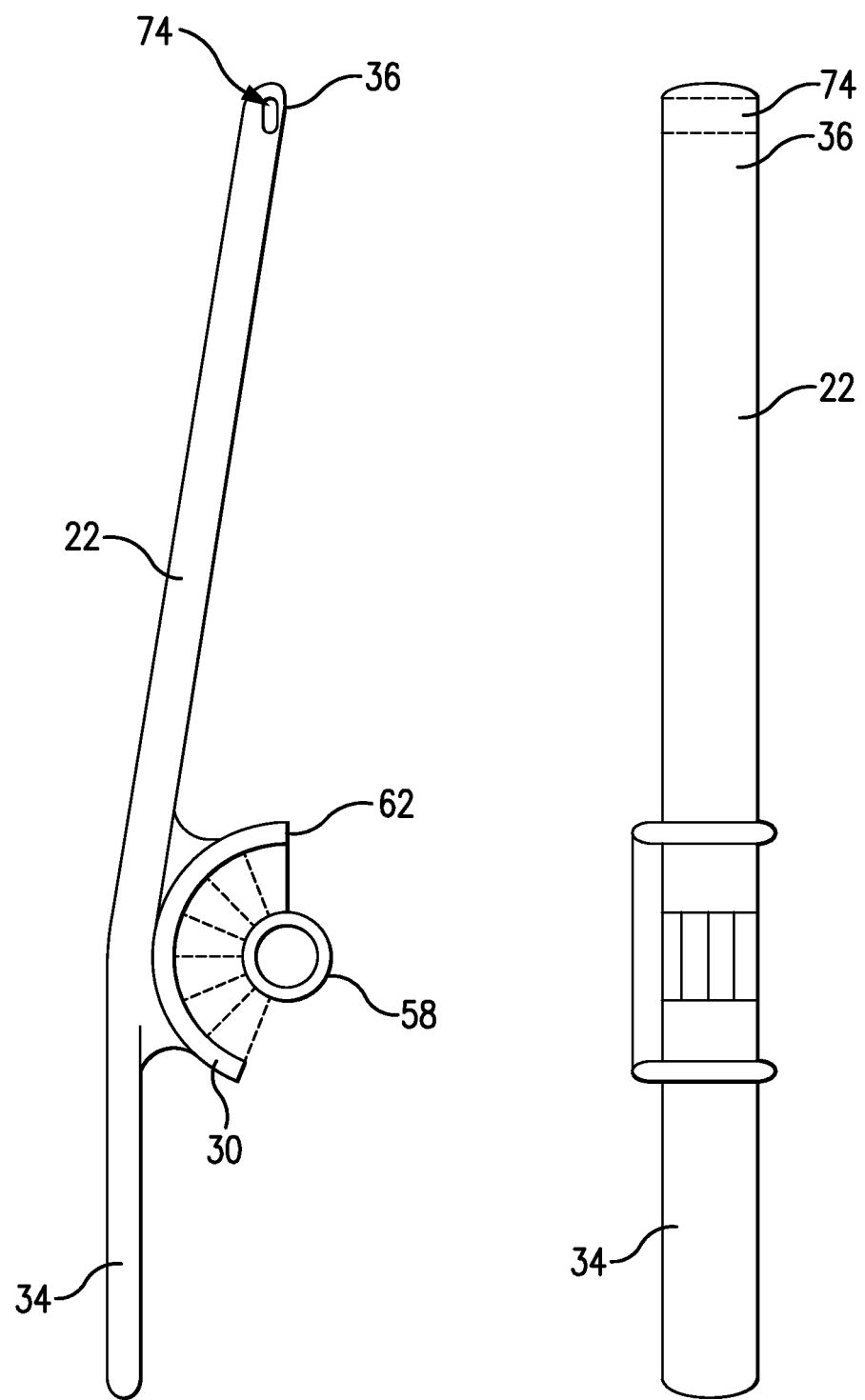
Figure 8:
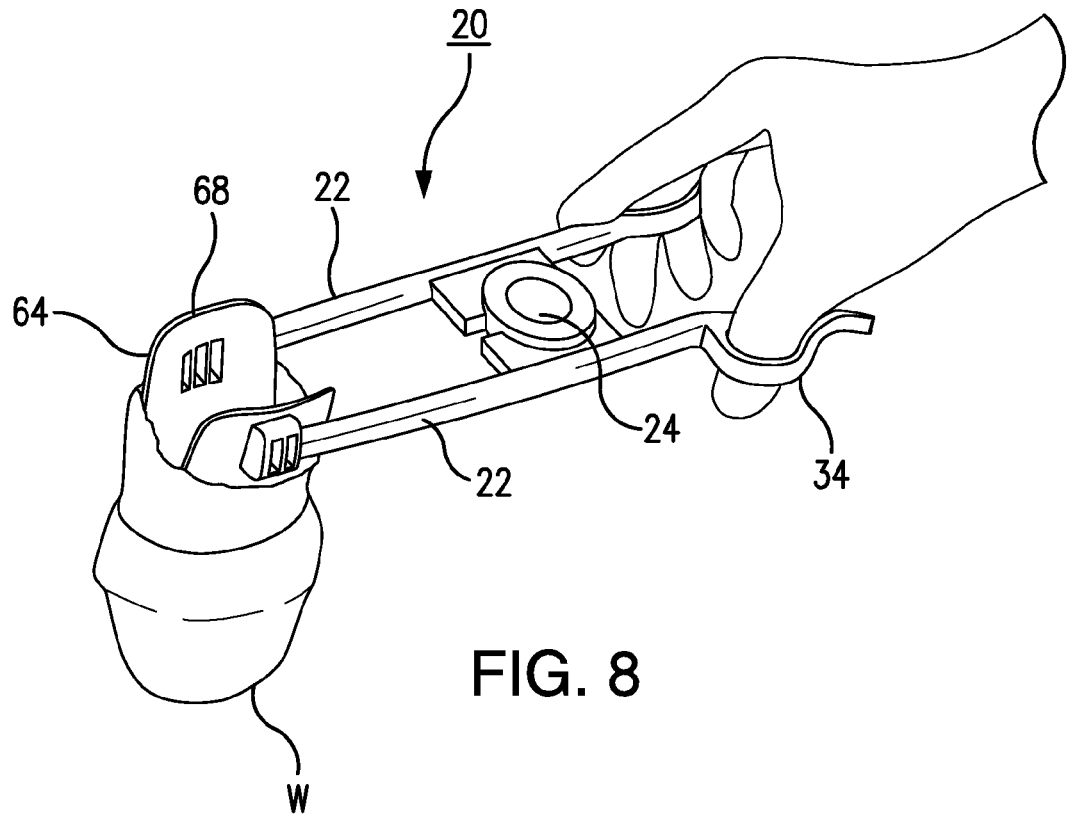
FIG. 8 is a perspective view of the insertion guide being inserted into an article of animal footwear.
Figure 9:
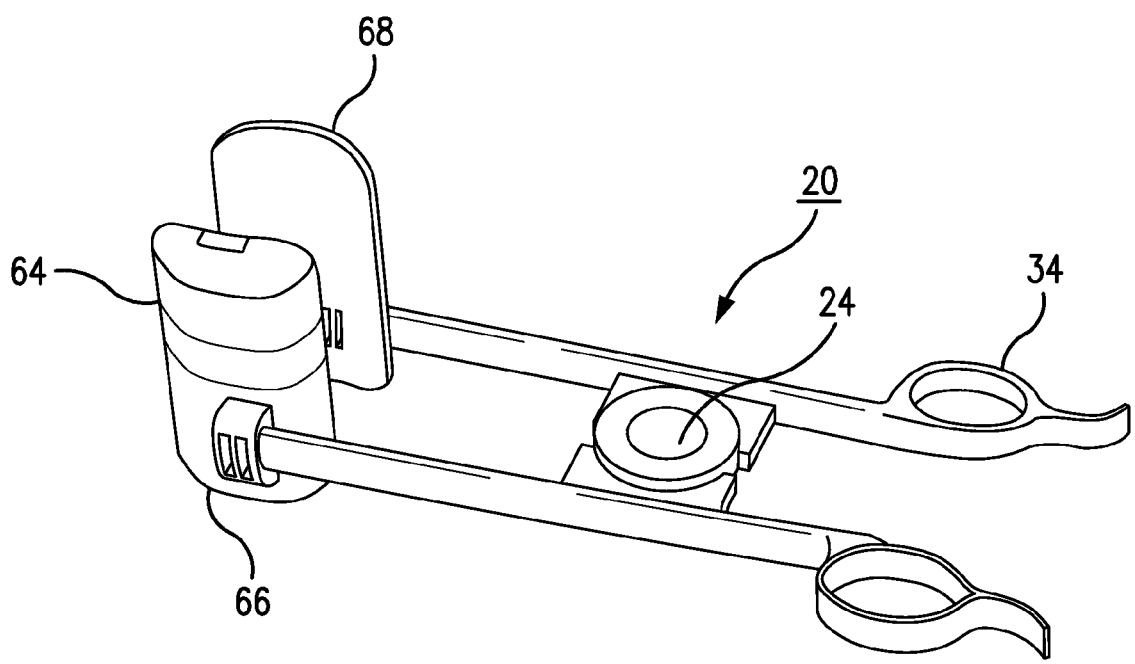
FIG. 9 is a perspective view of the insertion guide of the present disclosure.

FIG. 1 shows paw insertion guide (20) of the present disclosure in the closed position with the opposing paw guides (64) in contact with one another. FIGS. 8-9 illustrate the insertion guide (20) in the opened position with paw guides (64) spaced apart from one another. Insertion guide (20) is formed from a pair of arms (22) that are pivotally interconnected to one another. Each arm (22) includes a grip end (34) and a stretcher end (36). A protrusion (30) is formed between the grip end (34) and stretcher end (36) of each arm (22). Each protrusion (30) preferably takes an arcuate shape that is less than 180 degrees. With arms (22) joined to one another, the two protrusions (30) form a near circular shape. As noted in FIG. 1, a cut-out representing 10-15 degrees is formed at the bottom portion of the joined protrusions (30). A geared surface (62) is formed on the underside of each protrusion (30). This geared surface (62) acts to lock the insertion guide (20) in the opened position as described more fully hereinafter. An aperture (60) is also formed within each arm (22) and is used in pivotally interconnecting the two side arms (22). Fasteners (32) and (28) pass through aperture (60) to permanently lock the two side arms (22) (note FIG. 7). A slot (74) is formed at the stretcher end (36) of each arm (22). The function of slot (74) is described hereinafter.

A pair of paw guides (64) are positioned at the stretcher ends (36) of arms (22). Each paw guide (64) consists of two portions, an insertion portion (66) and a funnel portion (68). Additionally, a connector (72) is included for releasably interconnecting the insertion portion (66) to the funnel portion (68). Connector (72) can take the form of a male connector upon insertion portion (66) and a female connector with a resilient detent within funnel portion (68). Thus, insert portion (66) can be snap fit into funnel portion (68). Additionally, the male portion of connector (72) may be inserted be inserted through one of the slots (74) prior to being positioned within female portion of connector (72). In this manner, each of the paw guides (64) can be releasably secured to the stretcher end (36) of a corresponding side arm (22). Connector (72) is a quick connect/disconnect bracket fitting to allow interchangeable insertion guides (66) and funnel portions (68) to be used for various types of footwear and for animals of various sizes. One sock insert or paw guide will likely be suitable for use with multiple footwear sizes and a variety of types of footwear. One of the objectives of this invention is to eliminate the need for a different size paw guide for each different size or type of animal footwear.

A locking subassembly is also included for selectively keeping the insertion guide (20) in the opened position. The subassembly includes a lock (42) with a geared surface (44) and a shaft (46). The subassembly further includes a hinge plate (24) with a spindle (56). In the preferred embodiment, a Belleville-type spring washer (54) is positioned about the spindle (56). Other equivalent spring types can also readily be used, such as a Redux Wave spring, a Battery Spring, or other equivalents. As noted in the exploded view of FIG. 7, shaft (46) of lock (42) is positioned through the apertures (60) within arms (22) and secured within the spindle (56) of the hinge plate (24), whereby the arms (22) are pivotally interconnected.

Spindle (56) inserts over shaft (46) and locks in place to hold the entire assembly together; namely, lock (42), shaft (46), spring (54), and spindle (56) are all lockingly interconnected. Furthermore, these elements are locked together with fasteners (28) and (32) and spring (38) positioned therebetween.

Figure 6:
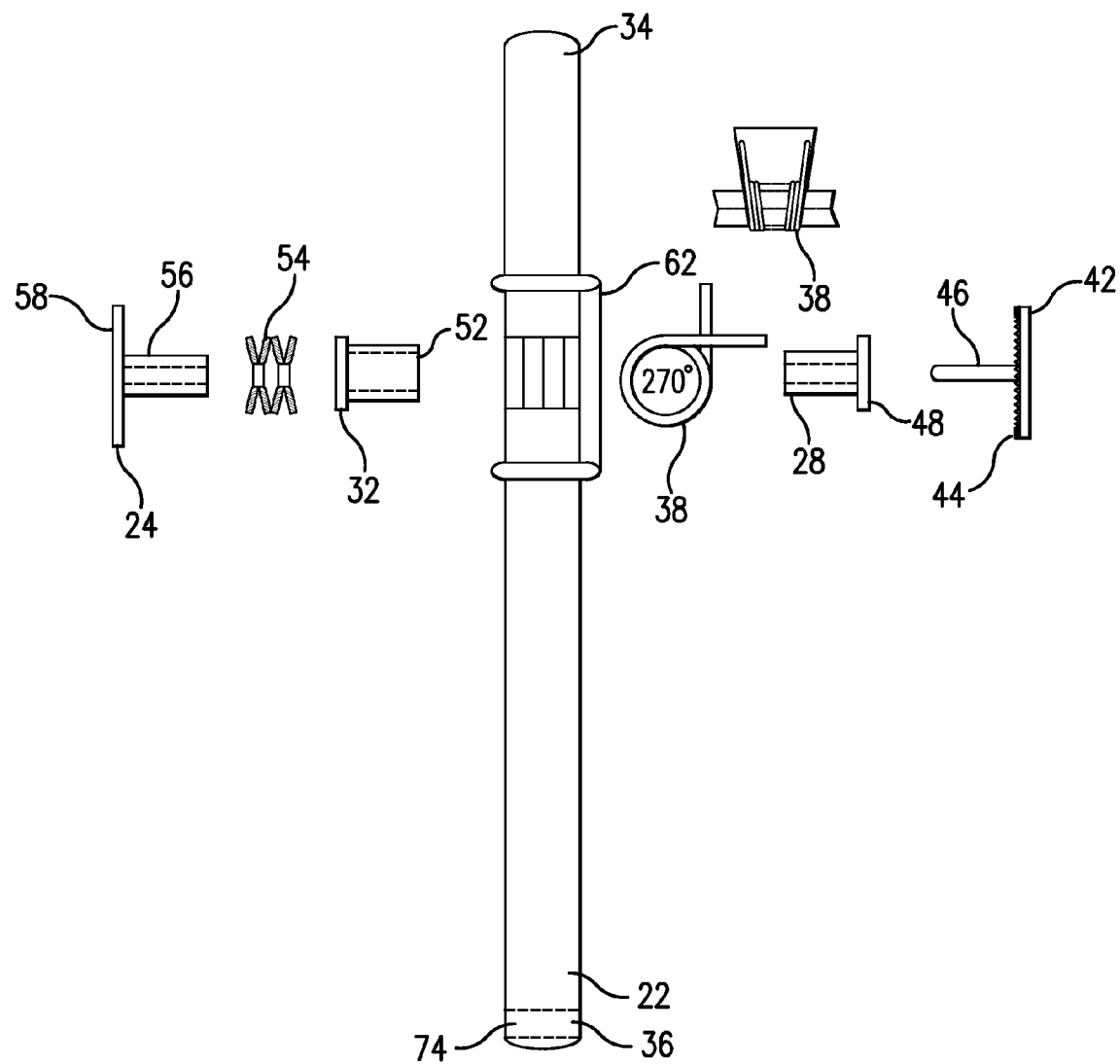
FIG. 6 is an exploded view of the side arm and locking subassemblies.
Figure 7:
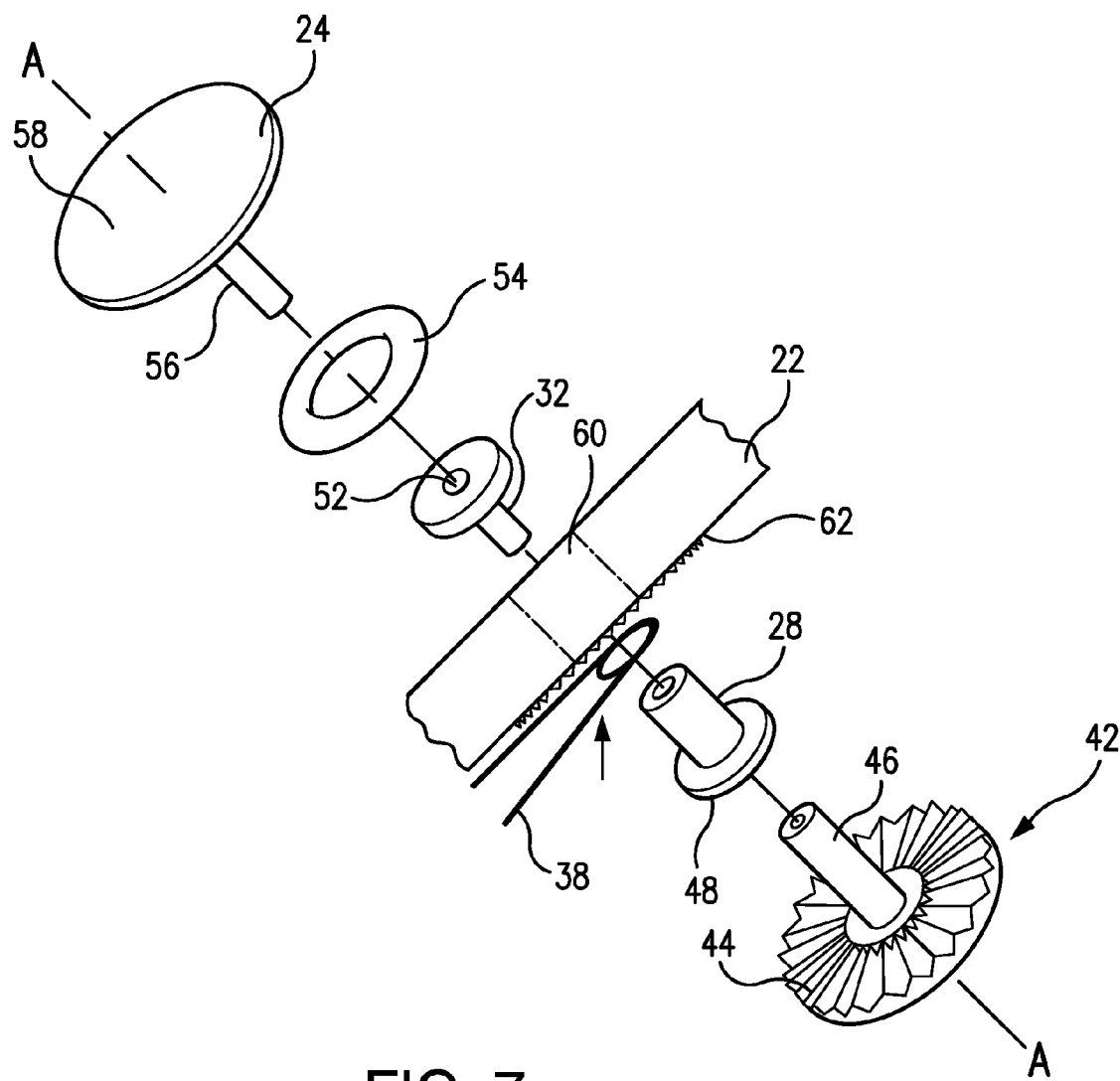
FIG. 7 is an exploded view of the of the side arm and locking subassemblies.

As most clearly illustrated in FIGS. 6 and 7, additional male (28) and female (32) inter fitting fasteners can optionally be included for keeping arms (22) lockingly interconnected. These fasteners (28) and (32) are positioned through central opening (60). Each of the fasteners (28) and (32) also includes a central opening for receiving shaft (46) and spindle (56). As depicted, a torsion spring (38) is inserted over fasteners (28) and (32). The end of spring (38) are fitted into grooves within side arms (22), such that spring (38) urges the arms into the closed position of FIG. 1. Namely, spring (38) pushes the grip ends (34) apart which keeps the stretcher ends (36) closed together. The force of spring (38) must be overcome by the user to open insertion guide (20) and separate the paw guides (64).

In use, the device (20) is typically in the closed position. This position allows the insertion portions (66) of the paw guides (64) to be positioned into the opening of footwear (F). Device (20) can then be opened by bringing the grip ends (34) together to spread the stretcher ends (36) apart. This results in the insertion portions (66) moving apart to more completely open the footwear (F). The Belleville spring washer (54) functions to urge the geared face (44) of the lock (42) into contact with the geared surfaces (62) of the arms (22) to thereby keep the device (20) in the opened position. Thus, the user need not keep pressure upon the grip ends (34) in order to keep insertion guide (20) opened. Thereafter, insertion guide (20) can be closed by depressing the center hinge plate release (58) within hinge plate (24). By depressing release (58), the force of Belleville spring washer (54) is overcome and spindle (56) pushes against lock (42) to thereby disengage geared faces (44) and (62). This permits the device (20) to be closed following insertion of the paw into the footwear (F).

As illustrated in FIGS. 8 and 9, the upper funnel or chute shaped portion (68) of guide (64) functions to line up a paw with the footwear opening. The insertion portion (66) is smaller and inserts readily into the top opening of the footwear (F) when the insertion guide (20) is closed. When the grip ends (34) are squeezed together the two halves of the insertion guide (20) move apart and stretch the footwear (F) open. The open paw guides (64) are locked open by the lock 42 and the locking subassembly. Now the paw is inserted through the paw guide (64) into the stretched open end of the footwear (F) and the footwear is pulled up in place until the toes and claws are at the tip of the footwear. Then lock (42) is released by pressing the release (58). The insertion guide (20) can then be removed from around the animal leg.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A device (20) for inserting an animal paw into an article of footwear (F), the device (20) having opened and closed positions and comprising:

a pair of arms (22), each arm (22) including a grip end (34), a stretcher end (36), and a geared surface (62) positioned therebetween, an aperture (60) formed within the arm (22), a slot (74) formed at the stretcher end (36) of the arm (22);

a pair of paw guides (64), each paw guide (64) including an insertion portion (66) and a funnel portion (68), a connector (72) for releasably interconnecting the insertion portion (66) to the funnel portion (68), the insertion portion (66) being connected to the funnel portion (68) through one of the slots (74) in the arms (22), whereby each paw guide (64) is secured to the stretcher end (36) of a respective arm (22);

a lock (42) for keeping the device (20) in the opened position, lock (42) includes a geared surface (44) and a shaft (46), a hinge plate (24) with a spindle (56), a Belleville spring washer (54) positioned about the spindle (56), the shaft (46) of lock (42) positioned through the apertures (60) within arms (22) and secured within the spindle (56) of the hinge plate (24), whereby the arms (22) are pivotally interconnected;

whereby with the device (20) closed, the insertion portions (66) of the paw guides (64) can be inserted into the footwear (F), the device (20) can then be opened by bringing the grip ends (34) together to spread the stretcher ends (36) apart and more completely open the footwear (F), the Belleville spring washer (54) functioning to urge the geared face (44) of the lock (42) into contact with the geared surfaces (62) of the arms (22) to thereby keep the device (20) in the opened position, the hinge plate (24) being depressed to overcome the force of Belleville spring washer (54) and disengage geared faces (44) and (62) and permit the device (20) to be closed.

2. A device (20) for inserting an animal paw into an article of footwear (F), the device (20) comprising:

a pair of pivotally interconnected arms (22), each arm (22) including a grip end (34), a stretcher end (36), and a substantially circular aperture (60) formed within each arm for the placement of a locking mechanism therein; and a paw guide (64) connected to the stretcher end of each arm (22), whereby the grip ends (34) can be brought together to spread the stretcher ends (36) and paw guides apart (64) and thereby allow the animal paw to be inserted into the footwear (F);

wherein each paw guide (64) comprises a lower insertion portion (66) and an upper funnel portion (68) and each paw guide comprises a connector (72) for releasably interconnecting the insertion portion (66) to the funnel portion (68).

3. The device (20) as described in claim 2 further comprising slots (74) formed at the stretcher end (36) of each arm (22), and wherein the insertion portion (66) is connected to the funnel portion (68) through the slot (74), whereby each paw guide (64) is secured to the stretcher end (36) of a respective arm (22).

4. A device (20) for inserting an animal paw into an article of footwear (F), the device (20) comprising:

a pair of pivotally interconnected arms (22), each arm (22) including a grip end (34), a stretcher end (36), and a substantially circular aperture (60) formed within each arm for the placement of a locking mechanism therein; and a paw guide (64) connected to the stretcher end of each arm (22), whereby the grip ends (34) can be brought together to spread the stretcher ends (36) and paw guides apart (64) and thereby allow the animal paw to be inserted into the footwear (F);

wherein each paw guide (64) comprises a lower insertion portion (66) and an upper funnel portion (68) and each paw guide comprises a connector (72) for releasably interconnecting the insertion portion (66) to the funnel portion (68);

wherein the locking mechanism further comprises a geared surface on each of the side arms (22), a lock (42) for keeping the device (20) in the opened position, lock (42) includes a geared surface (44) and a shaft (46), a hinge plate (24) with a spindle (56), a Belleville spring washer (54) positioned about the spindle (56), the shaft (46) of lock (42) positioned through apertures (60) within arms (22) and secured within the spindle (56) of the hinge plate (24), whereby the arms (22) are pivotally interconnected.

5. The device (20) as described in claim 4 wherein with the device (20) includes opened and closed positions, and where the insertion portions (66) of the paw guides (64) can be inserted into the footwear (F), the device (20) can then be opened by bringing the grip ends (34) together to spread the stretcher ends (36) apart and more completely open the footwear (F).

6. An insertion system (20) comprising:

an article of footwear adapted to be inserted over an animal paw;

a pair of pivotally interconnected arms (22), each arm (22) including a grip end (34), a stretcher end (36);

a lock (42) for keeping the device (20) in the opened position lock (42) includes a geared surface (44) and a shaft (46), a hinge plate (24) with a spindle (56), a Belleville spring washer (54) positioned about the spindle (56), the shaft (46) of lock (42) positioned through the apertures (60) within arms (22) and secured within the spindle (56) of the hinge plate (24); and a paw guide (64) connected to the stretcher end of each arm (22), whereby the grip ends (34) can be brought together to spread the stretcher ends (36) and paw guides apart (64) and thereby allow the animal paw to be inserted into the footwear (F).

* * * * *